US007898115B2

(12) United States Patent
Meltzner

(10) Patent No.: US 7,898,115 B2
(45) Date of Patent: Mar. 1, 2011

(54) POWER SUPPLY SWITCH

(76) Inventor: Jamie H. Meltzner, Edmond, OK (US)

( * ) Notice: Subject to any disclaimer, the term of this patent is extended or adjusted under 35 U.S.C. 154(b) by 184 days.

(21) Appl. No.: 12/394,709

(22) Filed: Feb. 27, 2009

(65) Prior Publication Data

US 2010/0219916 A1 Sep. 2, 2010

(51) Int. Cl.
*H02B 1/24* (2006.01)

(52) U.S. Cl. .......... 307/131

(58) Field of Classification Search .......... 307/131; 700/286

See application file for complete search history.

(56) References Cited

U.S. PATENT DOCUMENTS 3,728,500 A 4/1973 Ingram
3,754,107 A 8/1973 Balchunas
3,824,418 A 7/1974 Balchunas
3,997,742 A 12/1976 Marquis
4,171,471 A 10/1979 Boyles
4,297,546 A 10/1981 Koch
4,410,774 A 10/1983 Houpt et al.
5,258,656 A 11/1993 Pawlick
6,243,626 B1 * 6/2001 Schanin .......... 700/286
6,476,523 B1 11/2002 Lee
7,049,932 B2 * 5/2006 French et al. .......... 340/7.1
7,598,625 B2 * 10/2009 Yu et al. .......... 307/9.1
7,652,862 B2 * 1/2010 Martins .......... 361/93.1
2004/0178683 A1 9/2004 Hermetz et al.
2008/0061633 A1 3/2008 Blair et al.

* cited by examiner

*Primary Examiner* — Albert W Paladini
(74) *Attorney, Agent, or Firm* — Dunlap Codding, P.C.

(57) ABSTRACT

A power supply switch comprising a power input assembly receiving power from a power source, a power output assembly connected to an appliance and a control circuit between the power input assembly and power output assembly. The control circuit comprises a switch having an open position and a closed position and being manually resettable by a user to the closed position, wherein power is supplied from the power input assembly to the power output assembly when the switch is in the closed position; a current detection circuit sensing a current passing from the power input assembly to the power output assembly, the current detection circuit outputting an activation signal indicative of the presence of the sensed current; and a timer circuit receiving the activation signal and automatically activating a timer in response, wherein the timer sends a signal to the switch causing the switch to move to the open position after a delay time.

7 Claims, 3 Drawing Sheets

POWER SUPPLY SWITCH

CROSS-REFERENCE TO RELATED APPLICATIONS

Not Applicable

BACKGROUND OF THE INVENTION

Electrical appliances have become a vital part of virtually every household and business. Common electrical appliances include curling irons, flat irons, hair dryers, air compressors, electric tools, coffee pots, electric cookers, electric blankets, heating pads, computers and the like. Most common electrical appliances are used by homeowners each and every day and often are an important tool used in the home and/or business. Despite the enormous advantages common appliances afford users, there are also disadvantages. Such routine use of appliances often reduces the user's awareness of the operational state of the appliance. Also, users are often distracted or otherwise inattentive to the appliance.

A large percentage of household fires are attributable to inattentive use of electrical appliances. Frequently, such fires are caused by appliances that generate heat, i.e., hair dryers, curling irons, clothing irons, heating pads and the like. According to the U.S. Fire Administration, between 1998 and 2007, there were an estimated 397,650 residential structure fires annually resulting in 3,040 deaths and 14,960 injuries each year. These fires resulted in an average dollar loss of $6,029 million. In 2006, approximately 11.4 percent of those fires were attributable to heating, which includes such heat generating appliances. See www.usfa.dhs.gov, last visited on Feb. 5, 2009.

Another concern when using appliances is the energy usage, and thus cost associated with use. All electrical appliances consume energy. The cost of operating an electrical appliance ranges from several dollars to hundreds of dollars each year, depending on such things as the frequency of use and size of the appliance. Inattentive users frequently forget to turn off an appliance when they are finished using it and therefore the appliance continues to consume, and waste energy which also adds cost to their energy bill.

In recent years, the trend in appliance design has been to include an auto-shutoff feature for at least some appliances which removes power from the appliance after a predetermined time from when the appliance was turned on. However, these additional features add cost and complexity to the appliance design and manufacture. Therefore, many new appliances do not include an auto-shutoff feature. Also, there are a significant number of appliances already in use that were not manufactured with an auto-shutoff feature.

Thus, a need exists for a power supply switch that can be positioned between a power source and the appliance, the power supply switch operating to remove the power from the power source to the appliance after a delay time.

SUMMARY OF THE INVENTION

The present invention relates to a power supply switch for automatically removing power from an appliance after a time delay. The power supply switch is separate from the appliance and desirably includes a power input assembly, a power output assembly, and a control circuit. The power input assembly is generally connected to a power source, such as a standard 110 Volt outlet. The power output assembly supplies power from the power supply to the appliance.

The control circuit comprises a switch, a current detection circuit and a timer circuit. The switch is manually resettable and has an open position and a closed position. When manually reset, the switch moves to the closed position to permit power to be supplied from the power source through the power supply switch to the appliance. The current detection circuit senses a current passing through the switch to the appliance when the switch is in the closed position and outputs a signal indicative of the presence of the sensed current. The timer circuit receives the activation signal and automatically activates a timer in response. The timer sends a signal to the switch after a delay time which causes the switch to move to the open position. When the switch is in the open position, the power from the power source is not passed through the switch to the appliance.

In another embodiment of the present invention, the control circuit further includes an alternating current (AC) to direct current (DC) converter connected to the power input assembly. The AC-DC converter converts at least a portion of the power from the power source into a DC voltage which is then used to provide power to the circuitry included in the power supply switch.

In another embodiment of the present invention, the control circuit further includes a Transient Voltage Suppression (TVS) circuit. The TVS circuit operates to remove, or otherwise suppress transient voltages, e.g., voltage spikes and the like, from the power supplied by the power source. Removal or suppression of transient voltages protects the appliance and the power supply switch from damage caused by excessive voltage spikes.

In yet a further embodiment of the present invention, the control circuit further includes one or more timer set switch(es). The timer set switch(es) has one or more preset positions wherein each preset position corresponds to a different delay time. The user of the power supply can use the timer set switch(es) to select the delay time, i.e., the amount of time the switch will remain in the closed position after the detection of current passing from the power source to the appliance.

The advantages and features of the present invention will become apparent to those skilled in the art when the following description is read in conjunction with the attached drawings and the appended claims.

DETAILED DESCRIPTION OF THE INVENTION

Throughout this description, the term "power source" is understood to include any device, apparatus or system supplying an electrical signal capable of powering an appliance. For example, but not by way of limitation, a power source can be the standard 110 VAC, 60 Hz, two or three socket plug found in homes throughout the United States. Alternatively, the power source can be embodied in a proprietary system designed to provide a specific operational voltage or frequency to a particular appliance. The power source can also be the DCV signal available in automobiles, or alternatively, as the DCV signal utilized by airline carriers to provide power to passengers wishing to use electronic devices during flight. As would be understood by one having ordinary skill in the art, a power source can take a variety of sizes, configurations and electrical characteristics and still fall within the scope of the term power source as used herein.

Throughout this description, the term “appliance” will be understood to include any electronic device or apparatus which (1) has a plug that (2) utilizes AC single-phase or DC electricity to operate that (3) has a voltage less than 300V and (4) is designed to perform a specific function for household or light commercial use. Such appliances can include, but are not limited to, a toaster, hair dryer, curling iron, lamp, blender and the like.

Figure 1:
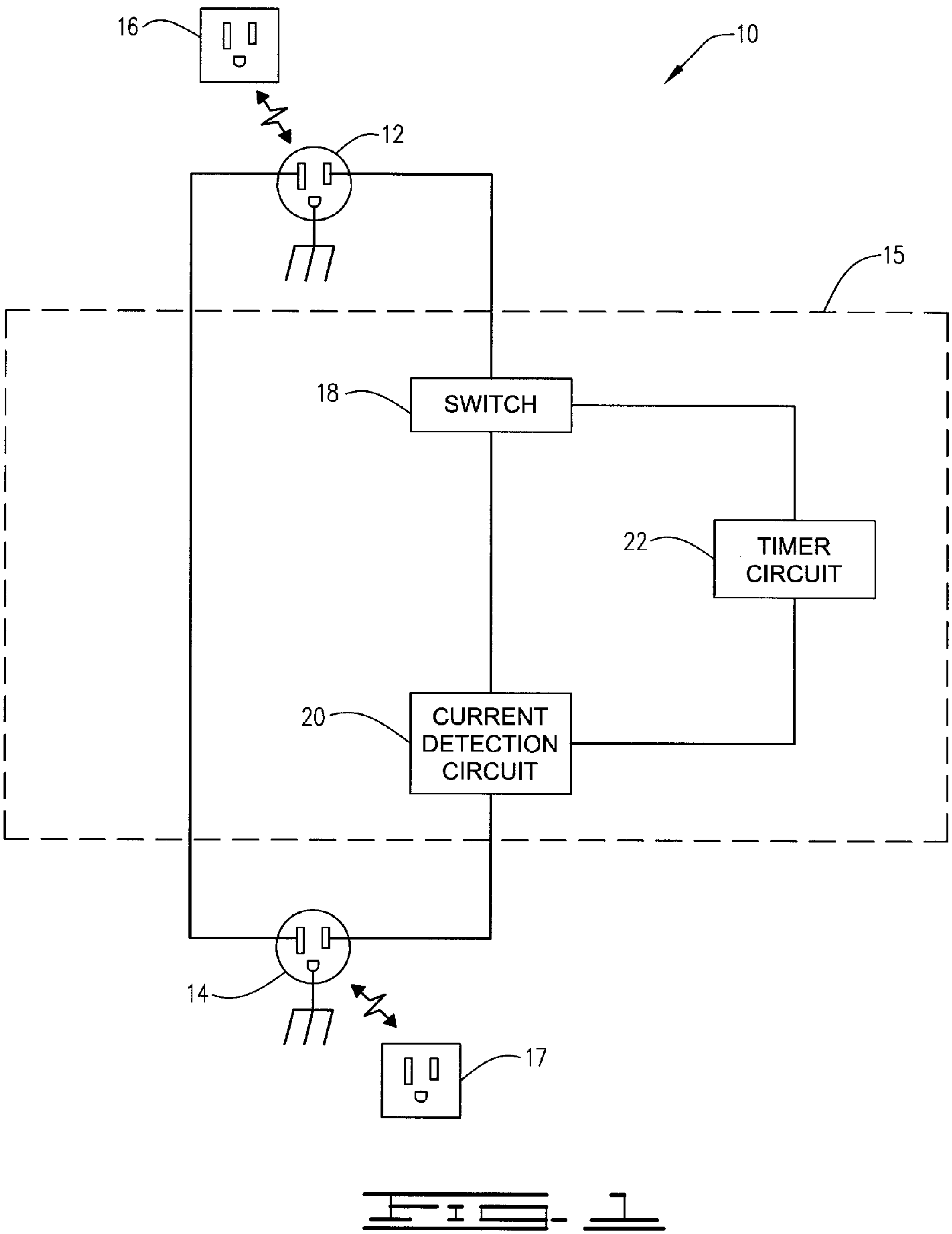
FIG. 1 is a schematic depicting a power supply switch constructed in accordance with the present invention.

Referring now to the drawings and in particular FIG. 1, shown therein and identified by reference numeral 10 is a power supply switch constructed in accordance with the present invention. The power supply switch 10 includes a power input assembly 12, a power output assembly 14 and a control circuit 15. When in an operation state, the power supply switch 10 is designed to be connected to a power source 16 and an appliance 17 such that power from the power source 16 passes through the power supply switch 10 to the appliance 17 connected thereto. The power input assembly 12 connects the power supply switch 10 to the power source 16 and the appliance 17 is connected to the power supply switch 10 by the power output assembly 14.

Figure 3A:
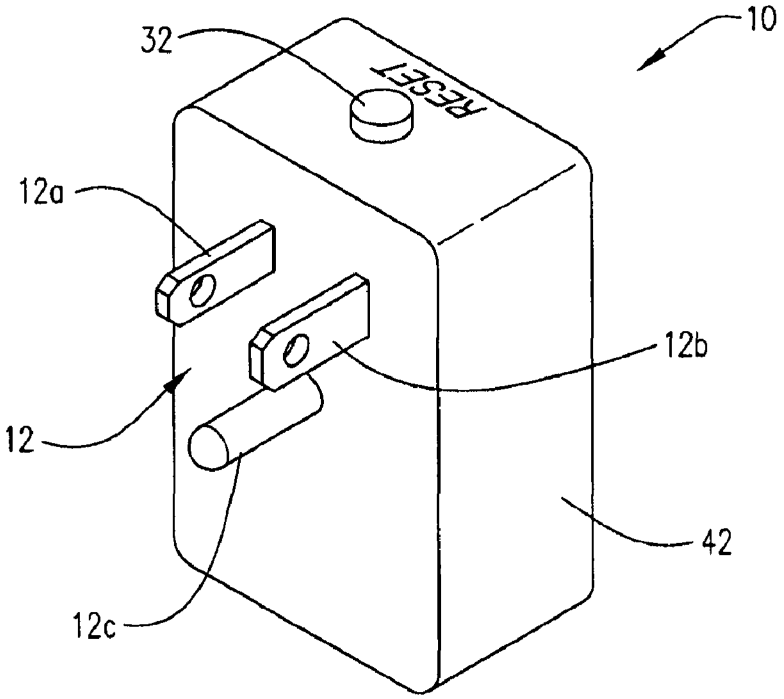
FIGS. 3*a* and 3*b* are opposite perspective views showing a specific embodiment of the power supply switch constructed in accordance with the present invention.
Figure 3B:
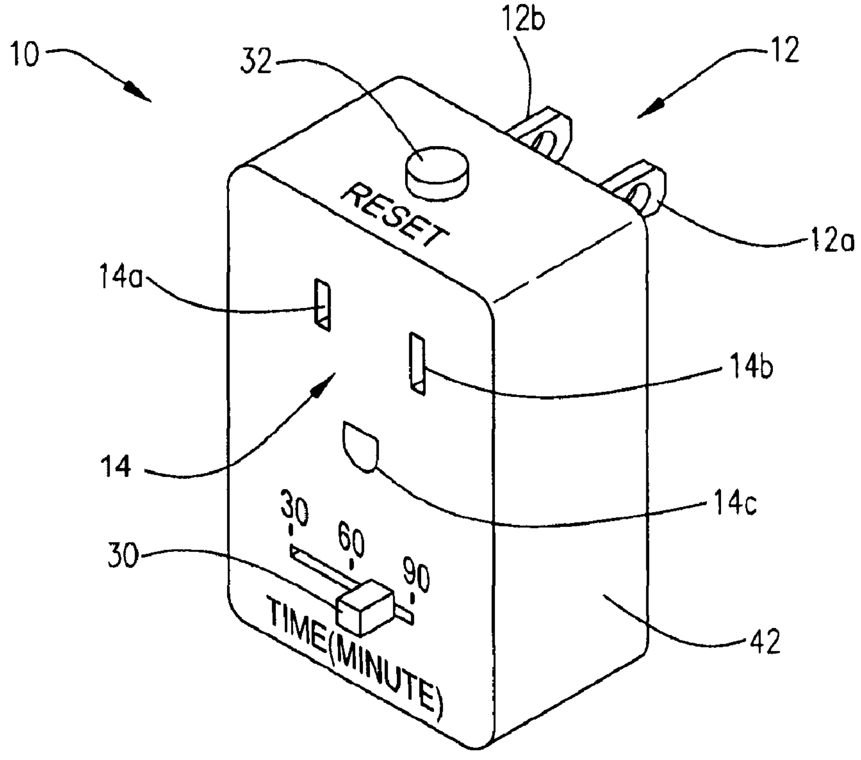

The power input assembly 12, as shown in FIG. 1, generally includes a plurality of prongs identified as 12*a*, 12*b*, and 12*c* (shown in FIGS. 3*a* and 3*b*). The power input assembly 12 can be configured to connect to, for example, a standard female 110 VAC electrical receptacle or outlet, as is commonly found throughout homes and businesses in the U.S. However, it should be understood that the power input assembly 12 can be constructed so as to be used with a convertor or adaptor so as to be capable of connecting to various electrical receptacle or outlet configurations and to accomplish the objectives of the currently described and claimed invention. Thus, power input assembly 12 would then be configured as the respective male plug or connector sized to fit into, or otherwise connect to the female electrical receptacle and can be either a two or three prong plug. However, as would be understood by one having skill in the art, the power input assembly 12 can be configured in any manner which allows the power from the power source 16 to enter the power supply switch 10 via the power input assembly 12.

The power output assembly 14, as shown in FIG. 1, generally includes a plurality of recesses identified as 14*a*, 14*b*, and 14*c* (shown in FIG. 3*b*). The power output assembly 14 can be configured in any manner to permit it to be connected to the appliance 17. For example, if the appliance 17 were configured to connect to the standard female 110 VAC electrical receptacle as described above, then power output assembly 14 would be configured as the female 110 VAC electrical receptacle or outlet in order to receive the appliance’s male plug. Generally, it should be understood that the power output assembly 14 can be configured in any manner which allows power from the power supply switch 10 to enter the appliance 17 via the power output assembly 14.

An example of the control circuit 15 is shown in FIG. 1. In this example, the control circuit 15 is comprised of a switch 18, a current detection circuit 20 and a timer circuit 22. The switch 18 has an open position and a closed position and is manually resettable by a user to the closed position. When manually reset to the closed position by the user, the switch 18 permits power from the power source 16 to pass through the switch 18 to the power output assembly 14 and the appliance 17 that is connected thereto. As will be described more fully below, the switch 18 is also configured to receive a signal from the timer circuit 22 and move to the open position in response thereto. When the switch 18 is in the open position, power from the power source 16 is not allowed to pass through the switch 18 to the power output assembly 14, thus, effectively turning the appliance 17 off. As would be understood by one having ordinary skill in the art, the switch 18 can be constructed in any manner which permits the aforementioned functions.

Figure 2:
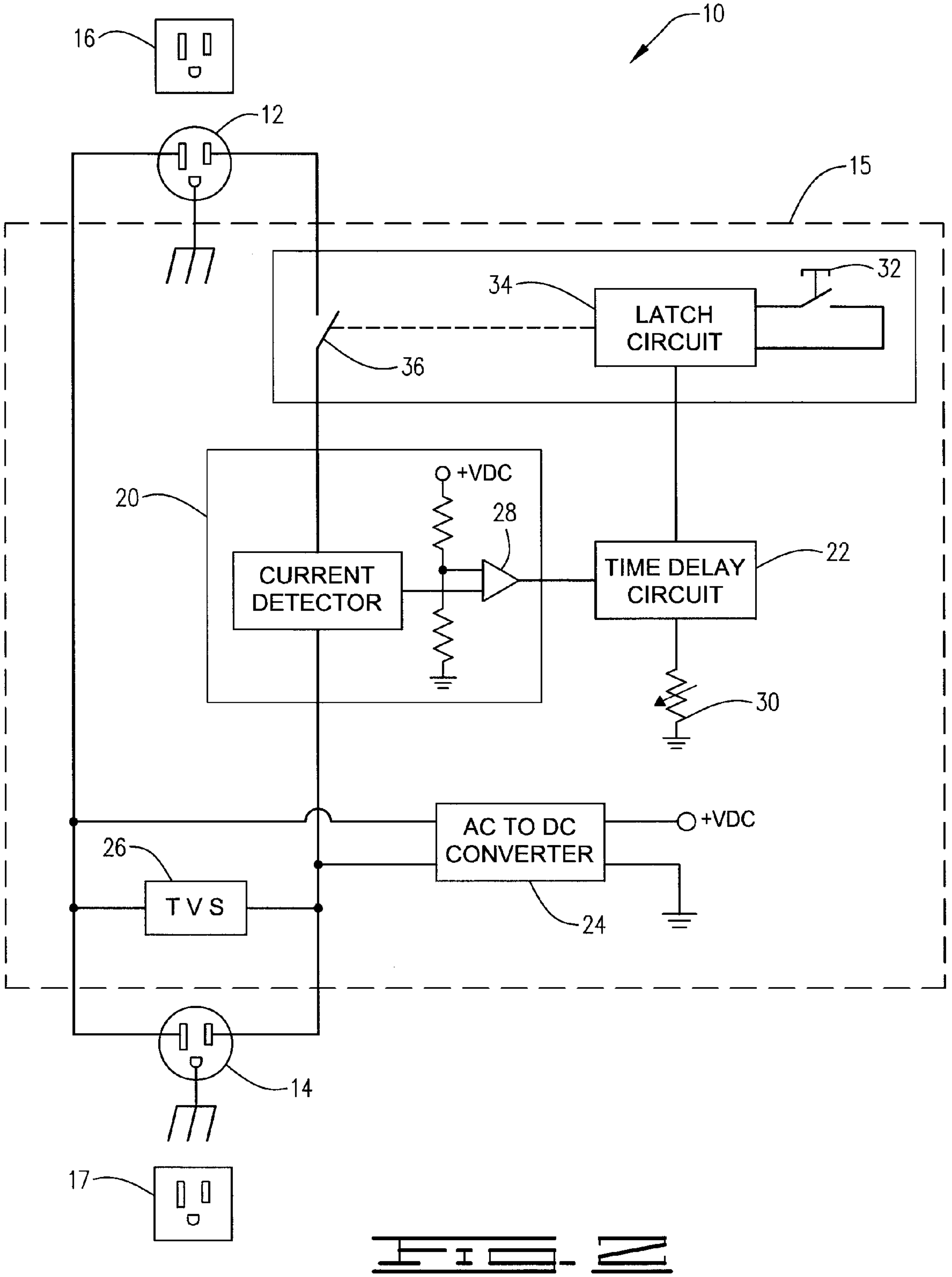
FIG. 2 is a schematic, diagrammatic view depicting a second embodiment of the power supply switch constructed in accordance with the present invention.

For example in a first embodiment as illustrated in FIG. 2, the switch 18 can be formed using a reset switch 32, a latch circuit 34 and a relay 36. In this first embodiment of the switch 18, the reset switch 32 is accessible to, and utilized by the user of the power supply switch 10 to activate the latch circuit 34 to place the relay 36 in the closed position. The latch circuit 34 is also configured to receive a signal from the timer circuit 22 and place the relay 36 in the open position in response thereto. The reset switch 32 can be implemented using a mechanical switch, electrical switch, a combination thereof or any equivalent which enables the user of the power supply switch 10 to manually reset the relay 36 of the switch 18 to the closed position.

The relay 36 can be implemented using a mechanical, solid state, combination thereof or any equivalent device which is capable of having an open position and a closed position and is able to be controlled by the latch circuit 34. More particularly, the relay 36 is moved from the open position to the closed position in response to the user manually resetting the reset switch 32 and is further capable of moving from the closed position to the open position in response to the latch circuit 34 receiving a signal from the timer circuit 22.

The latch circuit 34 can be implemented as any mechanical or solid state device, or equivalent thereof that is capable of sensing when the user of the power supply switch 10 manually resets the reset switch 32 and outputs a signal to the relay 36 in response thereto which switches the relay 36 to the closed position. Further, the latch circuit 34 is also capable of receiving a signal from the timer circuit 22 and outputting a signal to the relay 36 in response thereto which switches the relay 36 to the open position. As one having ordinary skill in the art would understand, the latch circuit 34 can be implemented in many forms or configurations that perform the functions described above. Such as, for example, a SR Latch (set-reset) can be used to implement the stated functionality.

The current detection circuit 20 operates to sense current passing through the control circuit 15 and then outputs an activation signal in response thereto. Methods of detecting a current passing along a path are well known in the art and will not be discussed in detail herein. It would be understood by one having ordinary skill in the art that common methods can include, but are not limited to, active sensing, e.g., placing a resistor in the current path and then sensing a voltage drop across the resistor. Another common method of detecting current involves the detection of electro-magnetic energy generated by current traveling along a path. Such detecting can be accomplished using a transformer, inductor or like device. However, other methods of detecting current are known in the art and can be used to implement the current detection circuit 20.

In a particular embodiment of the present invention, the current detection circuit 20 can include a comparator 28, as is shown in FIG. 2. In this embodiment, the comparator 28 generates the activation signal upon detection of current passing through the relay 36. The comparator 28 can be configured to output the activation signal once the sensed current reaches a predetermined level. As is known in the art, the current detection circuit 20 can also be implemented in other configurations which perform the functions described herein.

The timer circuit 22 receives the activation signal from the current detection circuit 20 and automatically activates a timer in response thereto. In one embodiment, the timer counts for a predetermined delay time and then outputs a signal to the switch 18 when completed. The timer circuit 22 can be implemented using mechanical, analog, digital circuitry or combinations thereof which perform the functions described herein. For example, and not by way of limitation, the timer circuit 22 can be implemented using a well known digital "555" timer circuit. In the alternative, the timer circuit 22 can be implemented using standard analog circuitry, e.g., a resistor-capacitor circuit. As a further alternative, the timer circuit 22 can be implemented using a mechanical device.

In a second embodiment of the present invention, the control circuit 15 can also be implemented using a micro-controller, microprocessor or the like in conjunction with a current sensing device, as described above, and a switch as is also described above. In this embodiment, the switch 18, current detection circuit 20 and timer circuit 22, or portions of each circuit can be implemented using a single microcontroller. For example, the current detection circuit 20 would utilize a sensing method previously described to sense current passing through the power supply switch 10. In this embodiment, the sensing method would output a signal indicative of the sensed circuit to an analog-to-digital function commonly found in micro-controller devices. The micro-controller could perform all, or at least many of the functions previously described with regards to the timer circuit 22, current detection circuit 20 and the latch circuit 34.

Also described herein is a method of automatically shutting off the power supplied from a power source 16 to an appliance 17 using the power supply switch 10 described herein. The method includes the steps of connecting the power input assembly 12 of the power supply switch 10 to the power source 16. Next, the appliance 17 is connected to the power output assembly 14 of the power supply switch 10. Before or after the appliance 17 is connected to the power output assembly 14, a user manually resets the switch 18 to the closed position such that power from the power source 16 can pass, or passes through the power supply switch 10 to the appliance 17 when the switch 18 is in the closed position. The appliance 17 is turned on and, the current detection circuit 20 senses a current passing through the switch 18 of the power supply switch 10 to the appliance 17 and outputs an activation signal indicative thereof. The timer circuit 22 receives the activation signal from the current detection circuit 20 and automatically activates a timer in response. The timer counts, or otherwise delays for a delay time and then outputs a signal to the switch 18 which causes the switch to move to the open position. As would be understood by one having ordinary skill in the art, power is not allowed to pass through the power supply switch 10 to the appliance 17 when the switch 18 is in the open position to automatically remove the power supplied from the power source 16 to the appliance 17.

The power supply switch 10 can also include several optional features as is illustrated in FIG. 2. For example, the control circuit 15 can further include an alternating current to direct current converter (AC-DC converter 24). The AC-DC converter 24 can be positioned to receive and convert at least of portion of the power from the power source 16 into a DCV. This DCV can be utilized to provide an operational DC voltage (+VDC) to the components of the control circuit 15.

The control circuit 15 can also include a Transient Voltage Suppression circuit (TVS circuit 26). This TVS circuit 26 can be positioned to detect and reduce and/or eliminate transient voltages from the power source 16. The TVS circuit 26 can be implemented using an array of devices that are designed to react to sudden or momentary overvoltage conditions. One known method of implementing a TVS circuit 26 is by using a zener diode. However, other methods can be used for the TVS circuit 26 without departing from the intent or scope of the present invention.

The control circuit 15 can also include a timer set switch 30. The timer set switch 30 can connect to the timer circuit 22 and operate to permit the user of the power supply switch 10 to select the delay time. More particularly, the user can use the timer set switch 30 to select the duration of the delay time. The timer set switch 30 can be configured with two or more preset positions wherein each position corresponds to a different delay time. For example, the user can use the timer set switch 30 to select a delay time of 30 minutes, 45 minutes, 60 minutes, or any other predetermined delay time. In another embodiment, the timer set switch 30 can be implemented using an analog device, such as a potentiometer or the like. The analog timer set switch 30 is configured with a minimum and a maximum setting which includes any number of settings therebetween. When the timer set switch 30 is implemented using such an analog device, the user of the power supply switch 10 can select a delay time of any length between the minimum and maximum time.

Shown in FIGS. 3*a* and 3*b* are opposite perspective views of a specific embodiment of the power supply switch 10 constructed in accordance with the present invention. As shown in FIGS. 3*a* and 3*b*, the power supply switch 10 can be formed as a unitary structure. However, the power supply switch 10 can also be formed as a non-unitary structure. For example, the power input assembly 12 (which includes, in one embodiment, a plurality of prongs 12*a*, 12*b*, and 12*c* operably associated with a conductive material) and the control circuit 15 can be formed as a unitary structure which includes a length of electrical cable extending therefrom. In this example, the power output assembly 14 (which includes, in one embodiment, a plurality of recesses 14*a*, 14*b*, and 14*c* operably associated with a conductive material) would be formed at the distant end of the electrical cable extending from the unitary structure. In a second example, the control circuit 15 and the power output assembly 14 can be formed as a unitary structure with a length of electrical cable extending therefrom. In this second example, the power input assembly 12 would be formed at the distant end of the electrical cable extending from the unitary structure. As a third example, the power input assembly 12, control circuit 15 and power output 14 assembly can be formed as individual structures with a length of electrical cable extending from and connecting each structure to the next. In each of the three examples, the power supply switch 10 could be formed to extend a length as needed by the user.

Described below is a specific embodiment of the power supply switch 10 constructed in accordance with the present invention. This embodiment is provided as one example of how the power supply switch 10 can be constructed but should not be interpreted as limiting the scope of the invention. As would be understood by one having ordinary skill in the art, the power supply switch 10 described herein is capable of being constructed in other embodiments without departing from the scope and intent of the invention.

As shown in FIGS. 3*a* and 3*b*, in this example the power supply switch 10 is contained within an enclosure 42 with a three-prong male electrical plug (power input assembly 12) protruding from one face of the enclosure 42 and a three-prong female electrical receptacle (power output assembly 14) located in the enclosure 42 on the opposite side. The enclosure 42 is preferably of a sufficiently small size that when the three-prong male electrical plug (power input assembly 12) is inserted into a standard household duplex electrical outlet, the enclosure 42 does not obstruct the use of the additional receptacle on the household duplex electrical outlet. Located on the top surface of the enclosure is a safety reset button (reset switch 32). A slide switch (timer set switch 30), located on the front of the enclosure 42, allows the operator to select a timing value (delay time) with preset values of 30, 60 and 90 minutes or other desired timing intervals.

Voltage transients, on the incoming power (power source 16), are suppressed by the TVS circuit 26, see FIG. 2. This aids in the protection of the internal circuitry of the power supply switch 10 as well as the low voltage control circuits in the attached appliance 17. The AC-DC converter 24 transforms the incoming 120 VAC to a low DCV used to power the control circuit 15 of the power supply switch 10. In series with the 120 VAC is the AC current monitoring circuit (current detection circuit 20). This circuit constantly monitors the current load on the power supply switch 10. As soon as the operator activates (turns on) the attached appliance 17, the appliance 17 begins to draw a current from the AC main supply (power source 16). Note: the power switching circuit (switch 18) is in a closed position for the current to flow to the attached appliance 17. The AC current monitoring circuit (current detection circuit 20) generates a voltage signal (activation signal) which is linearly proportional to the current drawn by the appliance 17 (see the comparator 28 of FIG. 2). The output of the comparator 28 is low if there is no current draw or if the current draw is below the threshold set point of the comparator circuit. The output of the comparator 28 will go to a high logic state once the voltage signal from the current monitoring circuit exceeds the threshold of the comparator set point. The comparator set point is predetermined to prevent nuisance tripping, a condition frequently caused by appliances 17 that may contain "Instant-On" circuitry.

Instant-On circuits usually consume currents in the low milliamp range and allow devices to start or turn on quickly without the need for control circuits to warm or boot up due to the fact that these circuits are always on when the appliance 17 is plugged into a powered electrical outlet.

The output of the comparator circuit is connected to the input of the timer circuit 22. When the output of the comparator toggles to a logic high state, the timer circuit 22 begins its timing countdown (delay time). The desired delay time is set by the operator via a sliding switch (timer set switch 30). The timer set switch 30 is preferably marked with intervals of 30, 60 and 90 minutes or other desired timing intervals. The operator should select the desired time set point based on the time required to complete the task performed by the appliance 17 plus a small buffer time to prevent the nuisance disconnection of power to the appliance 17 before completion of the desired task. The output of the timer circuit 22 remains in a logic low state until the timer circuit 22 timer interval equals the set point interval. Once the timer circuit 22 time interval equals the set point interval, the output of the timer circuit 22 generates a positive pulse of approximately 10 milliseconds. This pulse sets the latch circuit 34. Setting of the latch circuit 34 opens the electromechanical relay or de-energizes the solid state relay (relay 36) which disconnects power to the appliance 17.

The reset switch 32 must be depressed to reset the power supply switch 10. This manual reset switch 32 prevents reactivation of the power supply switch 10 in case of a momentary power failure of the electrical mains to the house or business.

From the above description, it is clear that the present invention is well adapted to carry out the objectives and to attain the advantages mentioned herein as well as those inherent in the invention. While one embodiment of the invention has been described for purposes of this disclosure, it will be understood that numerous changes may be made which will readily suggest themselves to those skilled in the art and which are accomplished within the spirit of the invention disclosed herein and defined in the appended claims.

What is claimed is:

1. A power supply switch for supplying power to an appliance, the power supply switch comprising:

a power input assembly to receive power from a power source;

a power output assembly configured to supply power to an appliance; and a control circuit connected to the power input assembly and the power output assembly, the control circuit comprising;

a switch having an open position and a closed position, the switch being manually resettable by a user to the closed position, wherein power is supplied from the power input assembly through the control circuit to the power output assembly when the switch is in the closed position;

a current detection circuit sensing a current passing from the power input assembly to the power output assembly when the switch is in the closed position, the current detection circuit outputting an activation signal indicative of the presence of the sensed current; and a timer circuit receiving the activation signal and automatically activating a timer in response, and sending a signal to the switch causing the switch to move to the open position after a delay time.

2. The power supply of claim 1, wherein the control circuit further comprises an AC-DC converter receiving and converting at least a portion of the power supplied from the power input assembly into a DC voltage to power the control circuit.

3. The power supply of claim 1, wherein the control circuit further comprises a transient voltage suppression circuit positioned in parallel with the power input assembly and substantially reducing transient voltages thereon.

4. The power supply of claim 1, wherein the control circuit further comprises a timer set switch in communication with the timer and having at least two preset positions wherein each preset position corresponds to a different delay time.

5. A method of automatically cutting off power to an appliance, the method comprising the steps of:

connecting a power input assembly of a power supply switch to a power source;

connecting a power output assembly of the power supply switch to an appliance such that power from the power source passes through the power supply switch to the appliance;

manually resetting a switch of the power supply switch to a closed position, such that the current can flow from the power input assembly to the power output assembly;

opening the switch a predetermined time period after the appliance is turned on to effectively turn off the appliance.

6. A power supply switch for supplying power to an appliance, the power supply switch comprising:

a power input assembly to receive power from a power source, wherein the power input assembly includes at least two prongs to facilitate connection to and receive power from the power source;

a power output assembly that is configured to receive a male plug from an appliance and which supplies power to the appliance, the power output assembly including at least two recesses;

a control circuit connected to the power input assembly and the power output assembly, the control circuit comprising;

a switch having an open position and a closed position, the switch being manually resettable by a user to the closed position, wherein power is supplied from the power input assembly through the control circuit to the power output assembly when the switch is in the closed position;

a current detection circuit sensing a current passing from the power input assembly to the power output assembly when the switch is in the closed position, the current detection circuit outputting an activation signal indicative of the presence of the sensed current; and a timer circuit receiving the activation signal and automatically activating a timer in response, and sending a signal to the switch causing the switch to move to the open position after a delay time; and an enclosure supporting the power input assembly, the power output assembly, and the control circuit, the enclosure further comprising:

a reset switch which allows an operator to manually reset the switch to the closed position; and a timer-set switch which allows the operator to manually select at least one pre-determined delay time, wherein the switch is placed in the open position upon an expiration of the manually selected timing value.

7. The power supply of claim 6, wherein the at least one timing value is selected from the group consisting of thirty, sixty, and ninety minutes.

* * * * *